United States Patent [19]

Sheehan et al.

[11] Patent Number: 4,614,360

[45] Date of Patent: Sep. 30, 1986

[54] PATIENT MEDICATION RECORD SYSTEM

[75] Inventors: Judith M. Sheehan, 2 Woodcrest Dr., Armonk, N.Y. 10504; Peter J. Engelman, Stamford, Conn.

[73] Assignee: Judith Sheehan, Armonk, N.Y.

[21] Appl. No.: 544,363

[22] Filed: Oct. 21, 1983

[51] Int. Cl.[4] ...................... B42D 17/00; B42D 15/00; B42F 21/00; G09D 3/00

[52] U.S. Cl. ........................................ 281/45; 283/36; 283/73; 283/900; 40/110

[58] Field of Search ...................... 283/36, 37, 73, 40, 283/900; 281/45; 40/488, 109, 110; 235/70 R, 89 R

[56] References Cited

U.S. PATENT DOCUMENTS

| | | | |
|---|---|---|---|
| 858,639 | 7/1907 | Walker | 281/45 |
| 1,007,760 | 11/1911 | Williams | 40/110 |
| 1,448,698 | 3/1923 | Murdoch | 283/900 |
| 1,524,164 | 1/1925 | Bennet | 40/110 |
| 1,567,613 | 12/1925 | Patton, Jr. | 283/73 |
| 3,047,312 | 7/1962 | Sampson | 283/36 |
| 3,051,123 | 8/1962 | Grove | 281/45 |
| 4,345,396 | 8/1982 | Janssen | 283/36 |

FOREIGN PATENT DOCUMENTS

| | | | |
|---|---|---|---|
| 2745732 | 4/1979 | Fed. Rep. of Germany | 283/37 |
| 2250281 | 10/1972 | France | 283/900 |
| 2458861 | 2/1981 | France | 283/900 |

*Primary Examiner*—Robert L. Spruill
*Assistant Examiner*—Paul M. Heyrana, Sr.
*Attorney, Agent, or Firm*—Lackenbach Siegel Marzullo Presta & Aronson

[57] ABSTRACT

A hospital patient medication record card system that includes a medication card mounted to a back support that in turn has a guide member affixed to its bottom edge. The guide member has markings, generally hour numerals, that generally indicate times related to the administration of medication for the patient. A marker member slidably mounted to the guide member can be selectively positioned over the numeral that indicates the time of the administration of the medication.

12 Claims, 11 Drawing Figures

PATIENT MEDICATION RECORD SYSTEM

This invention relates generally to hospital and/or long term care (LTC) patient medication record cards that are kept by on-duty floor nurses.

A hospital patient generally is prescribed a medication by his or her doctor at particular times during the day. The on-duty floor nurse is assigned a number of patients in her unit during the particular eight hour shift. In the system in general use in most hospitals today, a medication form, or card, for each patient in the particular unit is stacked with the other cards in a card index and is used to indicate the type of medication that is to be administered and the time it is to be given to the patient. The nurse, following the instruction at the time indicated, brings the medication to a particular patient. In the reality of hospital activities, however, the nurse often finds the patient missing from his or her room. The reasons for absence from the hospital room vary; as examples, the patient may be in x-ray, in therapy, or in the patient recreation room. Sometimes the patient can be found and sometimes not. When the patient is available, the nurse administers the medication and initials the patient medication card. When the patient is not available, the medication card is not initialed and is filed once again. If the nurse remembers later that she did not administer the medication, she will look for the patient again and, if she finds him or her, administer the medication. If the patient is not found, the medication card is again returned to the file.

One fact emerges from the above recitation, and that is that a busy nurse can eventually become hazy as to which of the patients have missed their medications. As a result, a patient may entirely miss an important medication, and at the least, a helpful medication. Much of the reason for hospitalizing a person is to control and to ensure proper medication. In the method used generally in hospitals today, the control aspect can be lost with the result that the hospitalization itself could lose a part of its validity. Of course, it is not claimed here that this occurs often, or that there is laxness, or that patients suffer because of this possible lack of tight control. But it can certainly be said that the present system puts an added burden on the duty nurse to constantly check and recheck her cards to make certain a medication administration has not been missed because of the general daily activity of the hospital. Furthermore, this fact alone creates the possibility of mistake.

SUMMARY OF THE INVENTION

Accordingly, it is an object of the present invention to provide a daily patient medication record card system that enables a nurse to immediately ascertain when a particular patient is due his or her medication and whether or not the patient has received the medication due without examining the patient's medication card in the ward card file for the nurse's initials in the medication column of the card.

It is another object of the present invention to provide a patient medication record card system that includes a record card having hourly numerals across the free edge of the card that is opposite the hinged edge of the card and further providing a marker that can be slid along the free edge and engaged at a selected hour.

It is yet a further object of the present invention to provide a patient medication record card system that includes a patient medication record card that is held on a hinged support back that has a marker that can be slid along an unhinged edge and engaged at one of the hours marked on the card.

It is yet another object of this invention to provide a transparent plastic marker that can be slidably mounted on a plastic support back holding a patient medication record card having time indicia such as hour or shift so that the marker can be slidably positioned to a selected position as a signal to the nurse on duty that a particular task is to be performed relating to the patient at the time or on the shift indicated.

In order to achieve the above objects, as well as others that will become apparent hereafter, a system is provided for a hosptial medication card record system that includes a card member including a front face having a printed design and data associated with said design relating to a particular patient and patient medication instructions including type of medication, method of administration of the medication, and the time of the administration of the medication. The printed design preferably includes blank spaces associated with the time of administration where a person's initials can be entered. The system includes a back support for the card member, the back support including a bottom straight edge and a top support rod for insertion into a general file with other patients' cards. A guide is connected to the back support along the straight edge of the support. Markings are preferably placed on the guide means that are visible to a person viewing the card member. The markings indicate general time for administering the medicine. There time can be hour numerals according to a scheme associated with a hospital shift or general color markings associated with shifts. A marker member is slidably mounted on the guide member for indicating selected markings designating a particular time for administering the medication.

The present invention will be better understood and the objects and important features, other than these specifically enumerated above, will become apparent when consideration is given to the following details and description, which when taken in conjunction with the annexed drawings, describes, discloses, illustrates and shows preferred embodiments or modifications of the present invention and what is presently considered and believed to be the best mode of practice in the principles thereof. Other embodiments or modifications may be suggested to those having the benefit of the teaching herein, and such other embodiments or modifications are intended to be reserved especially as they fall within the scope and spirit of the subjoined claims.

DESCRIPTION OF THE PREFERRED EMBODIMENTS

Figure 1:
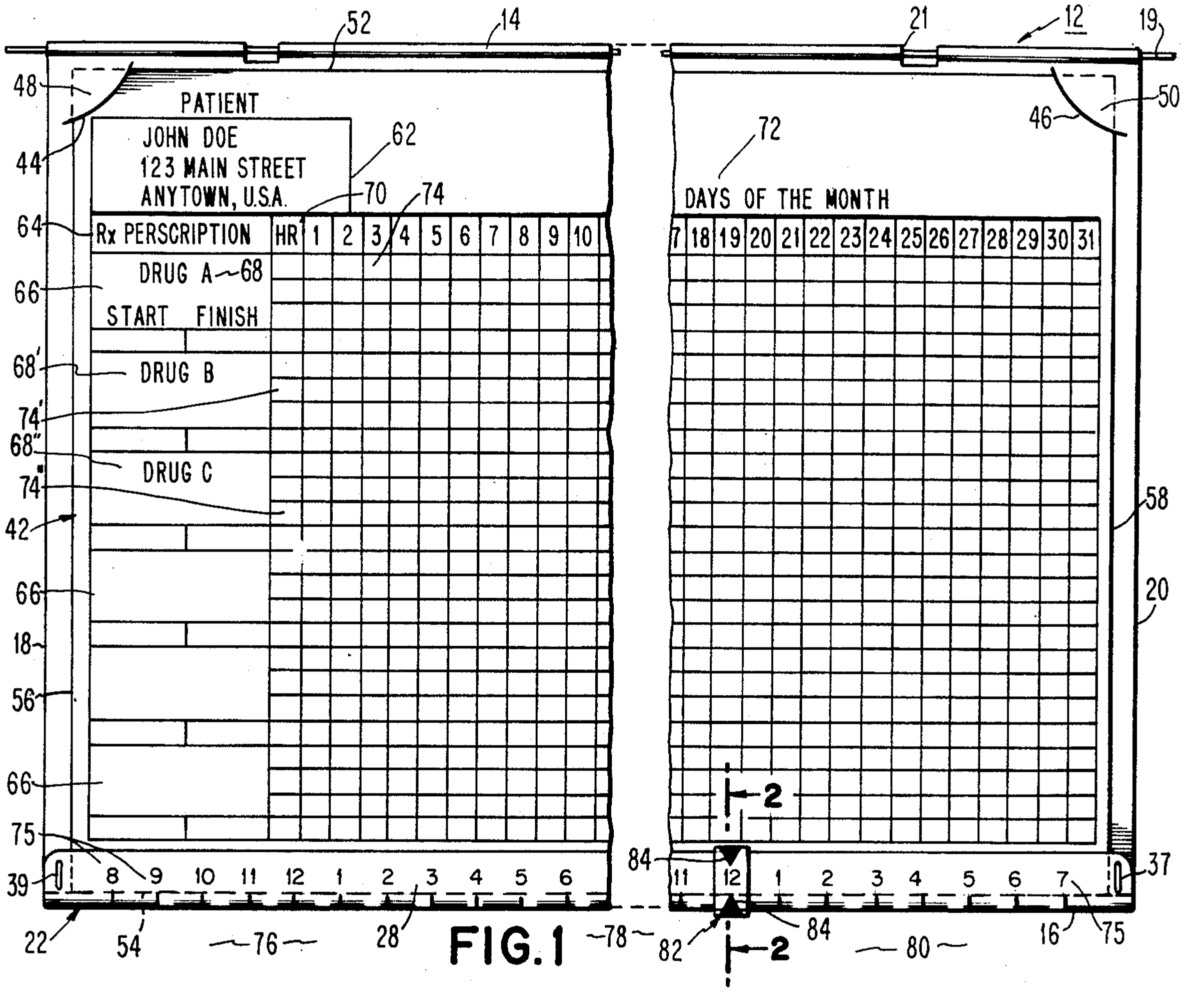
FIG. 1 is a front view of a three-shift, 24-hour schedule patient medication record card affixed to a clear plastic back support with a slidable marker member.

Reference is now made to the drawings and in particular to FIGS. 1–9 in which identical or similar parts are designated by the same reference numerals throughout.

Before proceeding with the detailed description, it should be said that the drawings and the accompanying description are for purposes of illustration of various embodiments of the invention. For this purpose, ideal hospital nurses' shifts are as follows: the first shift is from 8 A.M. to 4 P.M.; the second shift is from 4 P.M. to 12 A.M.; and the third shift is from 12 A.M. to 8 A.M. It is understood that in hospitals the shifts will often vary from these ideal shifts. For example, the first shift may be from 7:30 A.M. to 4 P.M.; the second shift from 3:30 P.M. to 12:00 A.M.; and the third shift from 11:30 P.M. to 8:00 A.M. It would be easy enough to adjust the ideal time shifts shown in the drawings accompanying this application to the actual working time shifts of a particular hospital.

A hospital patient medication record card system 10 illustrated in frontal view in FIG. 1 includes a flat support member 12 that is rectangular in configuration including a straight horizontal upper edge 14 with an opposed horizontal lower edge 16. Opposed left and right vertical edges 18 and 20 respectively intersect upper and lower edges 14 and 16. Support Member 12 is preferably made of a flexible, resilient transparent plastic material.

Figure 2:
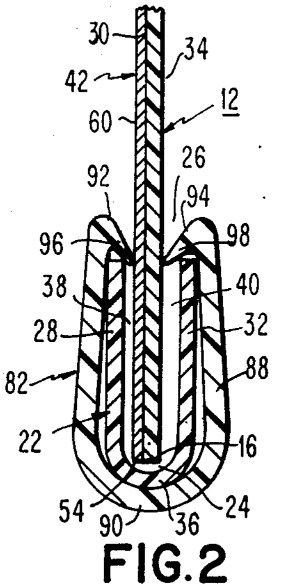
FIG. 2 is a sectional side view of the slidable marker taken through line 2—2 of FIG. 1.

The terms left and right used herein refer to left and right as viewed by the observer with reference to the embodiment shown in FIG. 1. A horizontal support bar 19 is positioned in a horizontal cylindrical receptacle 19 formed by support member 12 at upper edge 14. Support bar 19 extends outwardly beyond left and right edges 18 and 20. A horizontal mounting grip, or guide member 22, extends along lower edge 16 of support member 12. The structure of guide member 22 is best seen in FIG. 2, where lower edge 16 of support member 12 projects downwards into a horizontal recess 24 defined by a vertical front flat strip 28 that extends horizontally along and upwardly a short distance relative to lower edge 16 along front face 30 of support member 12; a rear horizontally disposed vertical strip 32 that is opposed to front strip 28 and that extends horizontally along and upwardly a short distance relative to lower edge 16 along rear face 34 of support member 12; and by bottom strip 36 that is hemispherical in cross-section as seen in FIG. 2 and that joins front and rear strips 28 and 32. Front and rear strips 28 and 32 are slightly spaced from flat support member 12 so as to define front and rear top horizontal recesses 38 and 40 formed between front and rear strips 28 and 32 and support member 12. Front strip 28 is affixed at its opposite left and right ends to front face 30 of support member 12 at left and right welds 35 and 37 respectively. Likewise, rear strip 32 is affixed at its opposite left and right ends to rear face 34 of support member 12 at left and right welds 39 and 41 respectively.

A substantially rectangular form, or card, member 42 is affixed to front fact 30 of support member 12. Because support member 12 is preferably transparent, card member 42 could be affixed to rear face 34 of the support member and read through the support member. A pair of arcuate slots 44 and 46 are formed by support member 12 at the upper left and right portions of support member 12 adjacent to the intersections of upper edge 14 with left and right vertical edges 18 and 20 respectively. Slots 44 and 46, which are bowed towards the center portion of support member 12, in turn form a pair of associated flap members 48 and 50 respectively.

Card member 42 includes opposed top and bottom straight horizontal edges 52 and 54 respectively intersected by left and right opposed vertical edges 56 and 58 respectively.

Card member 42 is affixed to support member 12 in part by the insertion of the left and right corners of top edge 52 and left edge 56 into slot 44 and of top edge 52 and right edge 58 into slot 46 so that flap members 48 and 50 resiliently press down upon the corners and hold card member 42 to support member 12. Bottom edge 54 of card member 12 is held in position in front horizontal recess 38 of guide member 22 between left and right welds 35 and 37. Card member 42 is thus removably affixed to support member 12.

Card member 42 has printed upon its face 60 a printed design that is adapted to accommodate the placement of data associated with the design and which relates to a particular designated patient and patient medication instructions, including type of medication, method of administration of said medication, and time of administration of said medication. The printed design includes blank spaces associated with the data where a person's, usually a nurse's, initials can be placed. Specifically as shown in FIG. 1, card member 42 includes a lined space for insertion of a patient's name and address, designated here by numeral 62 and noted as "John Doe" for purposes of illustration. Shown below name 62 is a prescription heading column designated by numeral 64. In prescription column 64 are six vertically aligned spaces 66. The first three of these spaces are shown with the name of the prescribed medication; namely, "Drug A", "Drug B", and "Drug C", designated here by the numerals 68, 68', and 68" respectively. The time the drug is to be administered is in the adjoining hour column, designated as numeral 70. Adjoining column 70 are 31 adjoining columns representing the days of the month. The days of the month heading is designated as numeral 72. It will be noted that for each time the drug is designated to be administered at designated drugs 68, 68', and 68", a blank space, generally designated as 74, 74', and 74", is provided where the administering person's, generally the nurse's, initials can be entered.

Attention is now directed back to guide member 22, and particularly to front strip 28. As can be seen in FIG. 1, a series of hour numerals 75 ranging from 8 through 12, then from 1 through 12, and again from 1 through 7 are imprinted from left to right along front strip 28. Hour numerals 75 range from 8:00 A.M. to 4:00 P.M., from 4:00 P.M. to 12:00 A.M., and from 12:00 A.M. to 8:00 A.M., each named grouping representing the morning shift 76, the evening shift 78, and the night shift 80, respectively. Different shadings on front strip 28 over each shift indicates the first, second, and third shifts more clearly. It is pointed out to the reader at this point that hour numerals 75 and shifts 76, 78, and 80 are not directly correlated to the printed design and indicia 62, 64, 66, 68, 68', 68", 70, 72, 74, 74' and 74" on card 42 discussed previously, which are related to the patient. As will be seen, hour numerals 75 printed on front strip 28 are directed only at the duty nurse.

A marker member 82 is slidably mounted on guide member 22. Marker member 82 as seen in the embodiment shown in FIGS. 1 and 2 is made of a transparent plastic material that is flexibly resilient. Marker member 82 has a pair of inwardly pointing arrows 84 that are sufficiently spaced apart to allow any selected one of shift hour numerals 75 to be positioned between them. FIG. 1 shows marker member 22 positioned so as to designate 12:00 A.M. of the second shift as the hour for medicine to be administered to the patient John Doe.

Marker member 82 in the embodiment shown in FIGS. 1 and 2 includes a marker front wall, or face 86, an opposed marker rear wall or face, 88, and a marker hemispherical bottom wall portion 90 that joins marker front and rear faces 86 and 88. Front, bottom, and bottom walls 86, 88,and 90 form a slot 90 having an open top. Slot 90 is adapted to receive guide member 22, as will be explained. Marker front and rear faces 86 and 88 and bottom wall portion 90 are slightly wider than shift hour numerals 75. Bottom portion 90 fits directly under bottom strip 36 of guide member 22 of support member 12. Marker front face 86 extends upwardly from bottom portion 90 outside of front face 28 of guide member 22; and marker rear face 88 extends upwardly from bottom portion 90 outside of rear face 34 of guide member 22. A pair of front and rear hooked prong members 92 and 94 respectively extend inwardly towards flat support member 12 so as to press against front and rear faces 30 and 34 respectively and in addition to extend downwardly into front and rear horizontal recesses 38 and 40 respectively. Because, as mentioned previously, marker member 82 is flexibly resilient, and in addition, is in a normal unbiased position when front and rear prongs 92 and 94 are closely spaced from one another, that is, are spaced more closely together than the thickness of flat support member 12, front and rear prongs 92 and 94 are biasedly pressed against flat support member 12 and also the top edges of front and rear strips 28 and 32, as shown most clearly in FIG. 2. The front and rear tips 96 and 98 of front and rear prong members 92 and 94 are narrow as shown in FIG. 2 so as to minimize frictional resistance between prong members 92 and 94 against front and rear faces 30 and 34 of support member 12 when marker member 82 is slid along guide member 22 during the process of selecting the desired numeral hour 75. Marker member 82 can be mounted onto guide member 22 at the side of assembly and left and right welds 37 and 39 then applied completely along the vertical edges of front and rear strips 28 and 32 so as to seal marker member 82 onto guide member 12. Alternatively, left and right welds 37 and 39 can begin slightly below the upper edges of front and strips 28 and 32 at their vertical edges so as to allow marker member 82 to be removably mounted onto guide member 22.

Figure 3:
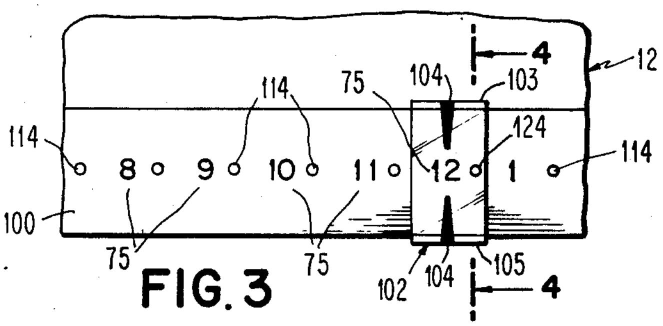
FIG. 3 is an isolated frontal view of a second embodiment of a slidable marker.
Figure 4:
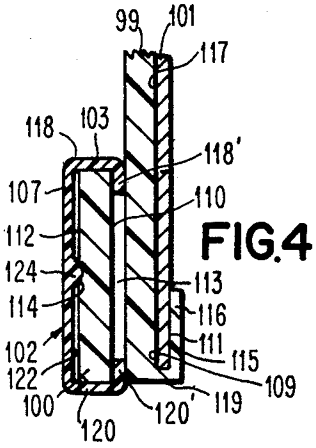
FIG. 4 is a sectional side view of the slidable marker taken through line 4—4 in FIG. 3.

A variation of the embodiment of support member 12, guide member 22, card member 42, and marker member 82 as shown in FIGS. 1 and 2 is shown in FIGS. 3 and 4 as support member 99, guide member 100, card member 101, and marker member 102, respectively. Card member 101 is positioned flat against the rear face of transparent support member 99. The upper portion of card member 101 is held by a pair of corner flaps until it goes to corner flaps 48 and 50 of FIGS. 1 and 2. Card member 101 is removably engaged at its bottom edge portion 109 is an elongated mounting member including a longitudinal flange piece 115 and a gripping wall 116, with flange piece 115 extending outwardly from rear face 117 at bottom edge 119 of support member 99 and with gripping wall 116 connected to and extending perpendicularly from the end of flange piece 115 so as to be generally parallel with support member 99. Flange piece 115, gripping wall 116, and support member 99 define a mounting slot 111 in which card member 101 is inserted. Marker member 102 includes a front wall 107 having marked on it opposed inward pointing arrows 104 and 109 having a space between them for showing a selected hour numeral 75. Guide member 100 like guide member 22 extends the length of the lower edge 16 of support member 12. As best seen in FIG. 4, guide member 100 is substantially flat with opposed inner and outer guide member faces 110 and 112, respectively. Inner face 110 is distanced slightly outwardly from front face 30 of support member 12 at space 113. Outer face 112 forms a hemispherical holes 114 disposed slightly to the right of each hour numeral 75. Marker member 102 has a front wall 107 that is made of transparent plastic so that the selected hour numeral 75 can be seen through the plastic. In the embodiment shown in FIGS. 3 and 4, the hour numeral is "12", indicating the patient John Doe is to receive a particular medication at 12:00 A.M., as seen in the overall view in FIG. 1. Marker member 102, particularly front wall 107, is just wide enough to accommodate the width of each hour numeral 75. Likewise, the height of guide member 100, particularly front wall 107, is sufficient to accommodate the height of each hour numeral 75. Top and bottom "U" portions 118 and 120 extending from the top and bottom edges of front wall 107 face one another so as to embrace the top and bottom edges 103 and 105 respectively of guide member 100, with the flange portions 118' and 120' of each U-portion 118 and 120 slidably disposed in space 113 between support member 12 and guide member 100. Guide member 100 is a strip having left and right ends (not shown) that are welded to front face 30 of support member 12. These welds keep marker member 102 from sliding from guide member 100. Front wall 107 of marker member 102 has a rear face 122 from which a hemispherical button 124 extends that is adapted to slip into and be removably gripped by hole 114 in face 112 of guide member 100. As seen in FIG. 3, button 124 is slightly to the right of the lengthwise center of and approximately midway between top and bottom U-portion 118 and 120 of marker member 102. This leaves the center portion of front wall 107 able to accommodate the selected hour numeral 75 at the center of the front wall. In particular, FIG. 3 shows the hour "10" to be the selected hour. This is analogous to FIG. 1, and so the selected hour is 10:00 P.M. for the administration of the medication for the patient. The locking between guide member 100 and marker member 102 at recess 114 and button 124 is easily unlocked by finger pressure against marker member 102 that moves marker member horizontally one way or the other to a new selected hour numeral where locking between button 124 and a new recess occurs.

Figure 5:
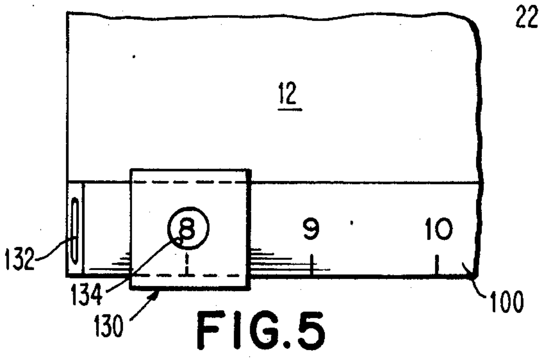
FIG. 5 is an isolated frontal view of a third embodiment of a slidable marker.

A variation of the embodiment shown in FIGS. 3 and 4 is shown in FIG. 5, where a marker member 130 similar in construction and arrangement to marker member 102 shown in FIGS. 3 and 4 is slidably mounted on guide member 100, which is the same as guide member 100 shown in FIGS. 3 and 4. That portion of guide member 100 as seen in FIG. 5 shows a left side weld 132 that is welded to front face 30 of support member 12. Weld 132 is one of the welds not shown mentioned in the discussion relating to FIGS. 3 and 4. Marker member 130 forms a circular window aperature 134 through which a selected hour numeral 75 may be seen. In particular, as shown in FIG. 5, the hour numeral selected is "B" and is interpreted to be 8:00 A.M. Because of the presence of window aperture 134, marker member 130 can be opaque, although it can be transparent with aperture 134 giving added clarity. It is noted that window aperture 134 can be formed by marker member 82, in particular on marker front face 86, in the embodiment shown in FIGS. 1 and 2.

Figure 6:
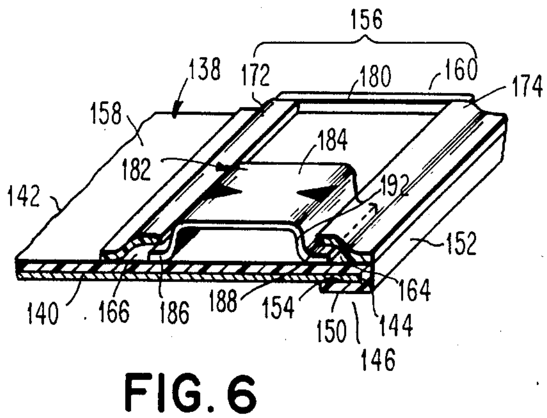
FIG. 6 is a perspective view of a fourth embodiment of a slidable marker.
Figure 6A:
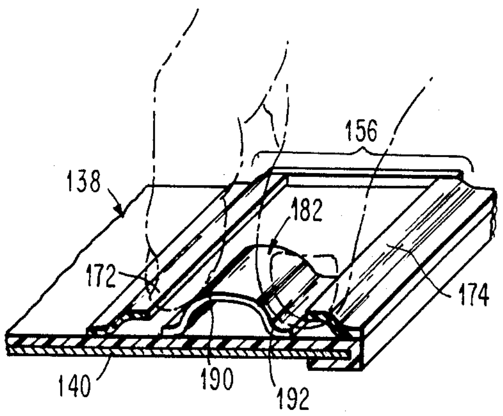
FIG. 6A is a perspective view of the fourth embodiment of the marker shown in FIG. 6 showing the marker in the process of being shifted.

Another embodiment of guide member and a marker member are shown in FIGS. 6 and 6A. Here, for purposes of illustration, a flat support member 138 made of transparent plastic material is shown in a horizontal position with a card member 140 pressed against the rear face 142 of support member 138. Card member 140 is removably engaged at its bottom edge portion 140 in a elongated mounting member including a longitudinal flange piece 148 and gripping wall 150, with flange piece 148 extending outwardly from rear face 142 at bottom edge 152 of support member 138 and with gripping wall 150 connected to and extending perpendicularly from the end of flange piece 148 so as to be generally parallel with support member 138. Flange piece 148, and gripping wall 150 and support member 138 define a mounting slot 146 in which card member 140 is inserted. This is the same construction and arrangement described for pocket support described in relation to FIGS. 3 and 4. A guide 156 preferably made of plastic material is affixed by welding or a similar method to the front face 158 of the bottom portion 160 of support member 138. Guide track 156 includes a top elongated pocket track 164 spaced from a bottom pocket track 166. That is generally aligned with the bottom edge of support member 138. Top and bottom pocket tracks 164 and 166 have respective top and bottom connecting strips 168 and 170 respectively that extend the width of support member 138 and are connected to its front face 158 by welding or a similar process known in the art. Top and bottom flange members 172 and 174 extend outwardly from top and bottom strips 168 and 170 respectively and then towards one another generally parallel to front face 158 of support member 138 so as to form the facing top and bottom elongated pocket tracks 164 and 168 with front face 158 of support member 138. One end stop 180 is shown in FIGS. 6 and 6A connected to the far right end portions of pocket tracks 164 and 166 of guide 156 and to the right edge of support member 138 by welding or similar means. A second end stop (not shown) is similarly connected to the left end of guide 156. A marker member 182 is slidably mounted in guide 156. Marker member 182 is made of a transparent plastic material which is also flexibly resilient. Marker member 182 includes a transparent top panel 184 marked with a pair of inward pointing arrows that are sufficiently spaced to allow a selector hour numeral 75 to be clearly seen between then. Top panel 184 is parallel to and spaced from front face 158 of support member 138 and in addition is spaced above top and bottom flange members 172 and 174 relative to front face 158 of support member 138. A pair of top and bottom marker flange portions 186 and 188 respectively are connected to the top and bottom portions respectively of marker panel 184 by way of a pair of top and bottom connecting portions 190 and 192 respectively. Top and bottom flange portions are adapted to be slidably received and positioned in top and bottom pockets 176 and 178 of guide 156. As seen in FIG. 6, top and bottom connecting portions 190 and 192 are in pressing connection with the inwardly facing edges of top and bottom flange member portions 172 and 174 respectively. In this pressing position, marker member 182 is basically in its unbiased mode but still slightly biased against flange member portions 172 and 174 to lock it in position over a selected hour numeral 75. The hour numerals 75 are imprinted on front face 158 of support member 138 between top and bottom flange members 172 and 174 in the same mode as in FIG. 1, the hour selected is 5:00 A.M. FIG. 6A shows a person's fingers 194 pressing top and bottom connecting portions 190 and 192 towards one another so as to put marker member 182 in a biased unlocked mode and at the same time releasing top and bottom connecting portions 190 and 192 from their pressing contact, or locked mode, with top and bottom flange members 172 and 174 of guide 156. In the unlocked mode, marker member 182 can be slid from one position to another along guide 156. When the desired hour numeral 75 is reached, the person will release the finger pressure against top and bottom connecting portions 190 and 192 so as to bias the connecting portions against top and bottom flange members 172 and 174, thus placing marker member 182 in its locked mode.

Figure 7:
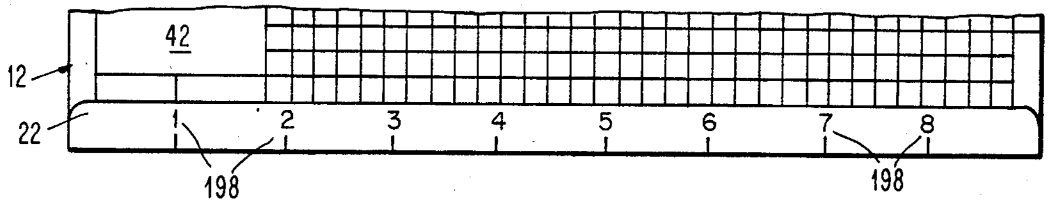
FIG. 7 is an isolation view of an 8-hour schedule for a patient medication record card.

FIG. 7 shows a variation of the hour numerals 75 shown in FIG. 1 that are imprinted along front strip 28 of guide member 22. As shown in FIG. 7, hour numerals 198 imprinted along the width of front strip 28 range over a single nurse's shift and are enumerated from 1 through 8.

Figure 8:
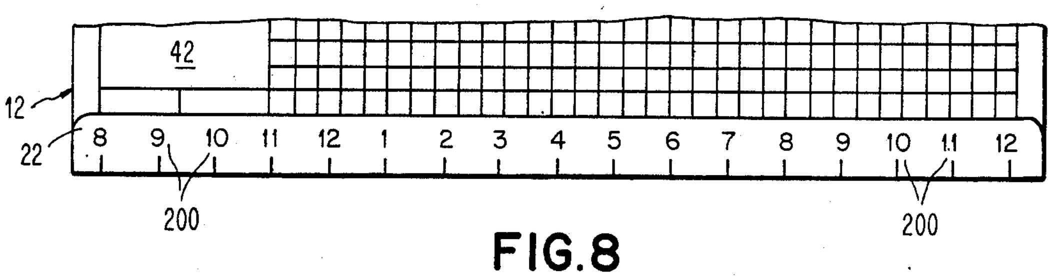
FIG. 8 is an isolated front view of a 24-hour schedule for a patient medication record card.

FIG. 8 shows yet another variation of hour numerals 75 shown in FIG. 1. Here, hour numerals 200 are imprinted on front strip 28 range over the morning and evening shifts when the patient would generally receive medication, namely, between 8:00 A.M. and 12:00 A.M.

Figure 9:
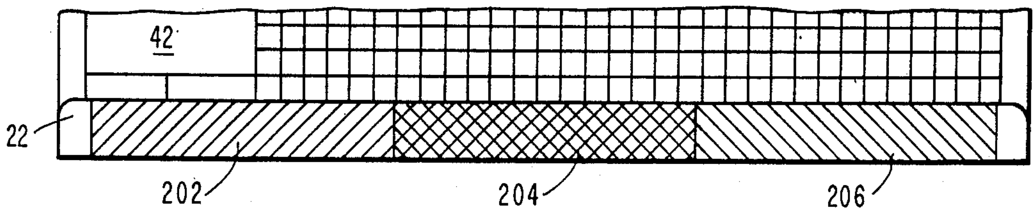
FIG. 9 is an isolated front view of a schedule for a patient medication record card.

FIG. 9 shows yet another variation from the hour numeral 75 scheme shown in FIG. 1. Here, front strip 28 is provided with three consecutive separate color portions, first color portion 202 to be left representing the morning shift; the second color portion 204 in the middle next to portion 202 representing the evening shift; and a third color portion 206 adjoining portion 204 representing the night shift. The marker member used would be positioned at the particular shift on which the duty nurse would be expected to provide medication for the patient indicated.

Figure 10:
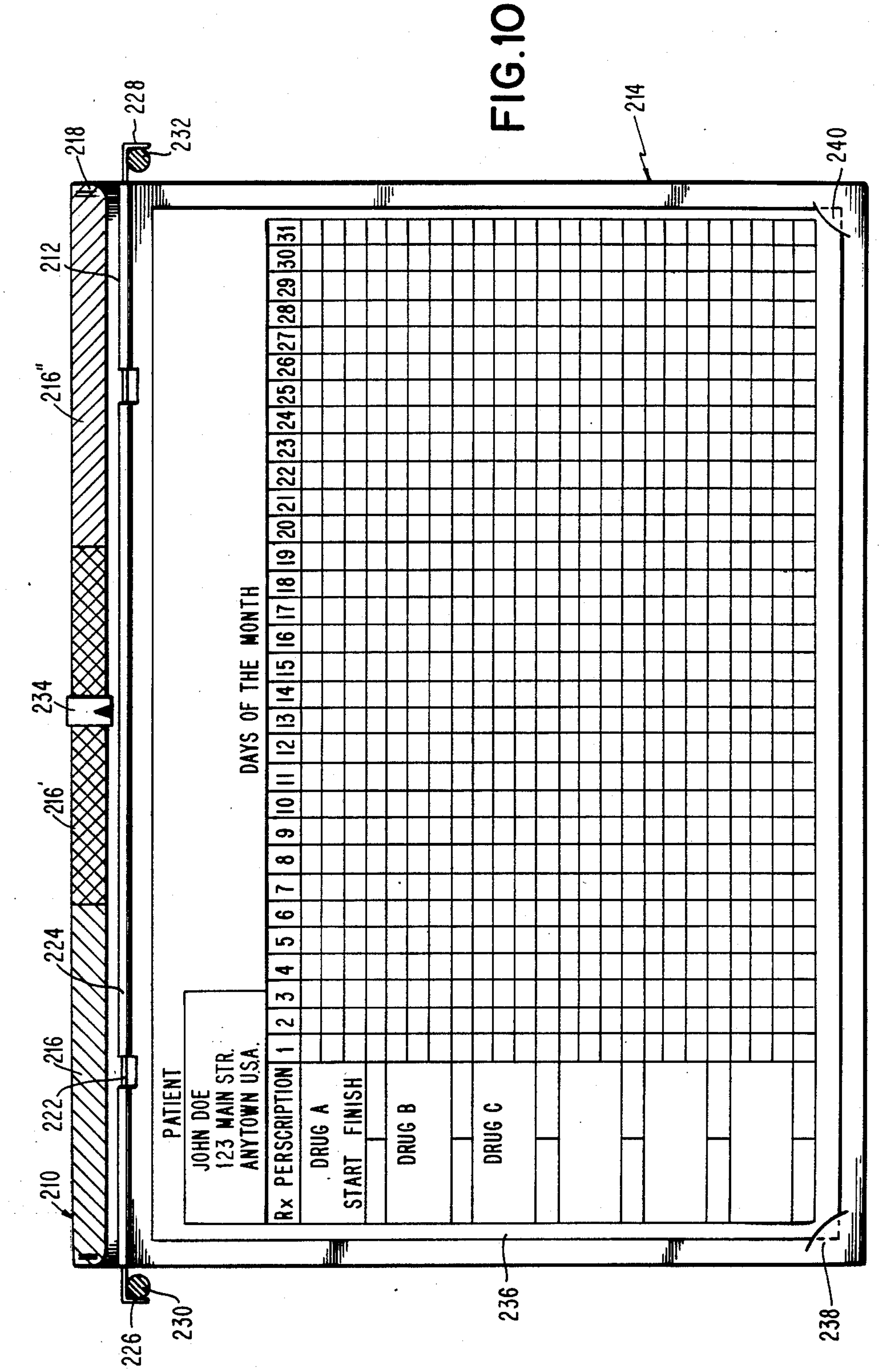
FIG. 10 is a view of a tickler-type file for a patient medication record card with a slidable marker.

A tickler type record card system is shown in FIG. 10. Here, a guide member 210 extends across the top edge portion 212 of a support member 214 including a guide member 215 with shift colors 216, 216′, and 216″ on front strip 218 disposed along the front face of the support member. Support member 214 and guide member 210 are analogous mutatis mutandis to support member 12 and guide member 22 of FIGS. 1 and 2, as is front strip 218 to front strip 28. A support bar 222 extends through a horizontal cylindrical receptacle 224 formed at the top edge portion 212 of support member 214. A pair of downward oriented hook members 226 and 228 positioned at opposite ends of bar 222 are adapted to be removably hung of a pair of support rods 230 and 232 that in turn are affixed to opposite sides of a file drawer (not shown). Thus, a marker member 234 analogous mutatis mutandis to marker member 82 of FIGS. 1 and 2 that is slidably mounted to guide marker 215 can be located to a particular shift and be seen viewed from the top of the card member 236. Card member 236 is removably affixed to front face 220 of support member 214 at the bottom by lower insert flaps 238 and 240 and at the top by insertion into guide member 215 in a similar manner as discussed with relation to guide member 22 of FIGS. 1 and 2.

It is to be noted at this time that the various hour numerals, such as hour numerals 75 of FIG. 1, can alternatively be printed along the bottom edge portion of the patient's card, such as card member 42 of FIG. 1. In such a case, guide member 22 must be transparent to allow the hour numerals to be read. In the case of FIGS. 4 and 6, support members 99 or 138 respectively must be transparent.

Although the present invention has been described in some detail by way of illustration and example for purposes of clarity and understanding, it will of course be understood that various changes and modifications may be made in the form, details, and arrangements of the parts without departing from the scope of the invention as set forth in the following claims.

What is claimed is:

1. A hospital patient medication record card system, comprising, in combination, a flat card member including a front face having a printed design and data associated with said design relating to a particular patient and patient medication instructions including type of medication and time of administration of said medication, said card member including opposed generally horizontal top and bottom edges and having opposed generally vertical side edges, means for supporting said card member extending between said top and bottom edges and said side edges and including horizontal upper and lower portions generally aligned with said horizontal top and bottom edges, guide means connected to said means for supporting and extending along one of said horizontal edges between said side edges, markings associated with said guide means visible to a person viewing said card member, said markings indicating general times for administering said medication, said markings extending along said one of said horizontal edges between said edges of said card member, self-biased marker means for indicating selected markings of said markings designating a particular time for administering said medication, said guide means being for slidably mounting said self-biased marker means, said marker means being releasably held in a selected position by bearing force, and means connected to said means for supporting for removably attaching said means for supporting to a general file of patient medication record cards.

2. A system according to claim 1, wherein said means for supporting is a flat support member forming gripping means for holding said card member.

3. A system according to claim 2, wherein said support member includes opposed front and rear faces and opposed sides and wherein said guide means is a guide member having opposed front and rear strips extending transversely respectively along said front and rear faces between said opposed sides at said one of said horizontal portions of said support member and a transverse strip joining said front and rear strips, said front and rear strips being affixed to said front and rear faces of said support member at said opposed sides, said front and rear strips and said flat support member forming respective front and rear horizontal tracking slots.

4. A system according to claim 3, wherein said marker means is a marker member having a front wall, a rear wall, and a transverse wall connecting said front and rear walls, said front, rear, and transverse walls being closely spaced outwardly from said front, rear, and transverse strips of said guide member, said marker member for the including a pair of prong members connected to said front and rear walls, said prong members being slidably mounted within said front and rear tracking slots, wherein said marker member is slidably mounted to said guide member and horizontally movable on said guide member at selected positions.

5. A system according to claim 4, wherein said marker member is made of flexible resilient material wherein said front and rear prongs are self-biased and are in a normally unbiased mode spaced closely from one another and are movable apart from one another to a biased mode with said front and rear prongs in said front and rear tracking slots of said guide member wherein said front and rear prongs are biasedly pressed against said support member and said card member and also are biasedly pressed against said front and rear strips of said guide member, wherein said marker member is releasably held in said selected position along said guide member.

6. A system according to claim 4, wherein said markings are imprinted on said guide member.

7. A system according to claim 5, said card member being disposed at said front face of said support member.

8. A system according to claim 5, wherein said one of said horizontal edges is said horizontal bottom edge, said horizontal bottom edge being positioned in said front tracking slot, whereby said card member is supported both by said front tracking slot and by said gripping means of said support member.

9. A system according to claim 5, wherein said support member is made of a transparent material, said card member being disposed at said rear face of said support member.

10. A system according to claim 9, wherein said markings are imprinted on said front face of said card member at said bottom edge, said guide member and said support member being transparent wherein said markings can be viewed through said guide member and support member.

11. A system according to claim 8, wherein said markings are imprinted on the front side of said card member at said bottom edge, said guide member being transparent wherein said markings can be viewed through said guide member.

12. A system according to claim 7, wherein said one of said horizontal edges is said horizontal top edge, and wherein said horizontal and vertical edges of said card member form four corners and said gripping means formed by said support members form four corner slots adapted to slidingly receive said four corners of said card member in gripping relationship.

* * * * *